Jan. 5, 1954 A. HYMAN 2,665,413
CONVERTING FROM AN UNBALANCED TO A BALANCED CIRCUIT
Filed Feb. 16, 1951
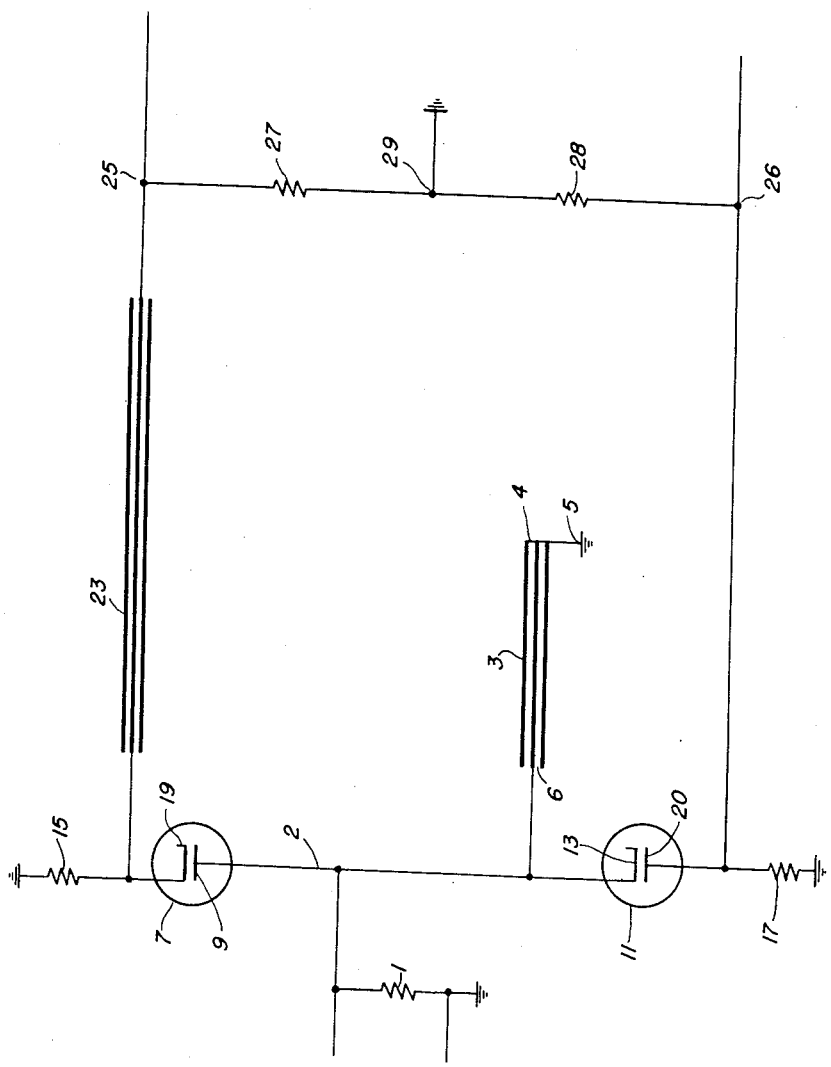
INVENTOR
ABRAHAM HYMAN
BY H. L. Godfrey
ATTORNEY Patented Jan. 5, 1954

2,665,413

UNITED STATES PATENT OFFICE 2,665,413

CONVERTING FROM AN UNBALANCED TO A BALANCED CIRCUIT

Abraham Hyman, New York, N. Y.

Application February 16, 1951, Serial No. 211,422

3 Claims. (Cl. 333—26)

(Granted under Title 35, U. S. Code (1952), sec. 266)

The invention described herein may be manufactured and used by or for the Government of the United States for governmental purposes without the payment to me of any royalty thereon in accordance with the provisions of the act of April 30, 1928 (ch. 460, 45 Stat. L. 467).

This invention relates to electric pulse systems and more particularly to means for converting unbalanced signal to balanced or push-pull signals.

In the field of high frequency electronics engineers must deal with unbalanced pulse signals wherein the pulse voltage is, at a given instant, entirely on the positive or negative side of a zero potential reference point, and with balanced or push-pull pulse signals wherein, at a given instant, there are two pulse voltage extremes of equal magnitude and opposite polarity, one on each side of the zero potential reference point. The means for converting one to the other which have been heretofore known are subject to one or more of the disadvantages of expense, limited bandwidth and uncertain life, and often are otherwise not conveniently adaptable to particular circuits.

An object of this invention is to provide improved means for converting unbalanced signals to balanced signals which can be adapted to varying bandwidths.

A further object of this invention is to provide an improved means for converting unbalanced signals to balanced signals which is dependable and not subject to unexpected failure.

A still further object of this invention is to provide means for converting unbalanced signals to balanced signals which is inexpensive.

Other objects will appear more fully from the following description and accompanying drawing wherein:

The single figure is a wiring diagram showing a preferred embodiment of the invention.

In the preferred embodiment of the invention illustrated in the drawing, a source of unbalanced positive pulse input signals is represented by a grounded resistor 1, which may be, for example, a load resistor for a thermionic tube or a terminal resistor for a transmission line. The input signal is applied to other elements by means of an input line 2.

Suitable means are provided for inverting the unbalanced positive pulse input signal. This may conveniently take the form of delay line 3 with a closed end 4 grounded at 5 and an open end 6 adapted to receive the unbalanced positive pulse input signal and to return an inverted or negative pulse signal to the input line 2.

Suitable means are also provided for passing towards a positive or first output line the positive pulse from the input line 2, while not passing the negative signal. In the embodiment illustrated in the drawing this is accomplished by a rectifier 7 with its anode 9 connected to the input line 2.

Similarly, means are provided for passing to a negative or second output line the inverted or negative pulse from input line 2, while not passing the positive signal. This may be accomplished by a rectifier 11 with its cathode 13 connected to the input line 2. The terms anode and cathode are used to indicate the direction of current flow through the rectifiers, but are not intended to restrict the invention to use of thermionic tube rectifiers. Various other rectifiers may be used with satisfactory results.

In the preferred embodiment shown in the drawing, two resistors 15 and 17 serve as biasing resistors and are connected between the cathode 19 of the rectifier 7 and ground, and between the anode 20 of the rectifier 11 and ground, respectively. The resistors 15 and 17 contribute significantly to convenience of design; however, it is possible in some embodiments of the invention to operate the invention without the two resistors 15 and 17.

When a closed end delay line is used for inverting the input pulse, then the inverted pulse is delayed in the delay line and lags the input pulse in passing through its rectifier. Hence, suitable means are provided for adjusting the time relationship of the input or positive and the inverted or negative pulses. A preferred means for accomplishing this is an open end delay line 23 which is twice the length of the closed end delay line 3, and which is adapted to receive the positive signal passed by the rectifier 7 and to transmit it to output terminal 25. The anode 20 of the rectifier 11 is connected directly to the output terminal 26.

Convenience of design sometimes makes it desirable to insert two resistors 27 and 28 in series between the two output terminals 25 and 26, and to ground the common terminal of the resistors, as at 29. The resistors 27 and 28 should be sufficiently large to absorb only an insignificant percentage of the output of the circuit, but small enough to establish a zero potential point in the output. Conveniently, a single resistor with a center tap may be used.

It is apparent that the functions of the resistors 15 and 27 may in some embodiments be combined in one resistor. Similarly, the functions of the resistors 17 and 28 may be combined.

In the operation of this embodiment of the invention, a positive-pulse unbalanced input signal is impressed across the resistor 1. This pulse passes through the rectifier 7 and appears across the resistor 15. The positive pulse passes through delay line 23 to the output terminal 25.

The positive pulse input signal is also applied to the closed end delay line 3, the end of which reflects a negative pulse. This negative pulse passes through the rectifier 11 and is thereby separated from the input signals. The negative pulse appears across the resistor 17 from which it passes to the output terminal 26.

The resistors 27 and 28 with a grounded center tap, serve to establish the neutral or zero potential points of the balanced voltage appearing between the output terminals 25 and 26. The negative pulses, passing twice the length of delay line 3, are delayed an amount equal to the delay effected on the positive pulses by delay line 23. Hence, the positive pulse appears at the terminal 25 at the same instant the negative pulse appears at the terminal 26. The output signal appearing across the terminals 25 and 26 is a balanced pulse with equal magnitude on each side of ground.

It will be understood that the embodiment shown and described is purely illustrative and that modifications may be made therein without departing from the spirit and scope of the invention as set forth in the appended claims.

What I claim is:

1. In an electric circuit for converting an unbalanced pulse signal into equal and opposite push-pull signals, and input connected to two oppositely poled terminals of two rectifiers and to a closed end delay line, the other terminal of one rectifier being connected to a first output terminal through an open end delay line having an effective length twice that of the closed end delay line, the other terminal of said other rectifier being connected to a second output terminal.

2. In combination an input connected to the anode of a first rectifier and the cathode of the second rectifier, the cathode of the first rectifier being connected through an open end delay line to a first output, the cathode of the second rectifier being connected to a closed end delay line having an effective length of approximately one-half that of said open end delay line, the anode of said second rectifier being connected to a second output.

3. The combination of claim 2, in which the cathode of the first rectifier and the anode of the second rectifier are each connected through resistance to a point of reference potential, and in which the first and second outputs are each connected through resistance to a point of reference potential.

ABRAHAM HYMAN.

References Cited in the file of this patent

UNITED STATES PATENTS

| Number | Name | Date |
|---|---|---|
| 2,525,106 | Wendt | Oct. 10, 1950 |
| 2,530,957 | Gilman | Nov. 21, 1950 |
| 2,546,371 | Peterson | Mar. 27, 1951 |
| 2,569,927 | Gloess et al. | Oct. 2, 1951 |